Figure 1:
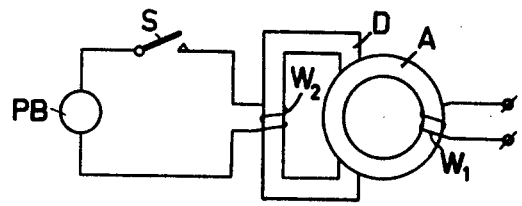

Aug. 17, 1965    W. BONGENAAR ETAL    3,201,594
CIRCUIT FOR LINEARLY CHANGING THE MAGNETIZATION OF A CORE
Filed May 5, 1961    2 Sheets-Sheet 1

INVENTOR
WILLEM BONGENAAR
ADRIANUS J.W.M. VAN OVERBEEK
BY  THEODORUS J. TULP
AGENT

United States Patent Office 3,201,594
Patented Aug. 17, 1965

3,201,594
CIRCUIT FOR LINEARLY CHANGING THE MAGNETIZATION OF A CORE
Willem Bongenaar, Adrianus Johannes Wilhelmus Maria van Overbeek, and Theodorus Joannes Tulp, all of Emmasingel, Eindhoven, Netherlands, assignors to North American Philips Company, Inc., New York, N.Y., a corporation of Delaware
Filed May 5, 1961, Ser. No. 108,069
Claims priority, application Netherlands, May 12, 1960, 251,541
5 Claims. (Cl. 307—88)

This invention relates generally to a device for changing the magnetisation of a magnetic circuit, at least a part of the magnetic circuit consisting of a material having a comparatively high retentivity.

A device of this general type is already known which may be used for counting pulses. See, for instance, U.S. Patent 3,075,084. In the known device, means are provided to supply a controllable number of megnetising or demagnetising pulses to a winding coupled to the magnetic circuit, the amplitude and the duration of the pulses being chosen so that each pulse causes only a comparatively small change of the magnetisation. The remanence of the magnetic circuit is thus changed stepwise under the control of these pulses. For example, starting from a predetermined initial condition, pulses of a predetermined polarity may be supplied until the magnetic material reaches the magnetic saturation condition and the inductance of the control winding suddenly decreases strongly, after which the pulse series is discontinued. The number of pulses is then a measure of the change of inductance caused, so that, in principle, this device may be used as a pulse counting circuit.

It has also been proposed to use a device of the general type for control purposes, the strength of the magnetic flux in an airgap determining another electrical quantity. For example, by use of the magneto-resistance effect or the Hall-effect, the strength of an electric current may be varied: in response to the changes in magnetization the strength of the magnetic flux and consequently also of the said electric current may be adjusted at a desired value by supplying pulses to the magnetic circuit.

The advantage of such a device is that the adjustment is maintained for an indefinite period, provided no further pulses are supplied to the magnetic circuit; no permanent control current is required to maintain the adjustment at the desired value.

The known devices are based on the consideration that in general, an induced voltage is proportional to the change of a magnetic flux per unit of time; conversely, a change of the magnetic flux or the magnetic flux density is proportional to the time integral of the voltage of the applied electrical signal. This would consequently mean that, if all the control pulses have the same voltage content, i.e., the same time integral, these pulses would also have to cause an equal change of the magnetisation and consequently a linear relationship would have to exist between the magnetisation and the number of pulses supplied.

It has appeared in practice that the linear relationship does not exist; at most, it only holds approximately if the pulses are comparatively strong. If pulses having less voltage content are used, for example to be able to count a larger number of pulses within a definite interval of the magnetisation, or to be able to obtain a more accurate adjustment of the magnetisation, it appears that the said relationship between the magnetization and the number of pulses is substantially non-linear in addition, the maximum range across which the magnetisation can be changed becomes smaller as the voltage content of the pulses becomes smaller. For practical uses this is generally a great drawback.

An investigation of the above phenomena has revealed that they are the result of the fact that a magnetic change actually consists of two parts, namely a reversible part and a part having a remanent or permanent character, while the relation between the two parts is not constant but is dependent on the absolute value of the magnetisation. The sum of the two parts is proportional to the voltage content of the control pulses. As the share of the change with permanent character becomes smaller when the absolute value of the magnetisation changes, the stages in the remanent inductivity will consequently be smaller. On the other hand, when using comparatively strong control pulses, a comparatively large change of the retentivity will occur on the occurrency of each pulse, so that the remanence change per pulse will be large compared with the reversible parts; thus, if the pulse content is constant a variation of the reversible part plays a smaller role. This also serves to explain the fact that the relation between the magnetisation and the number of pulses becomes more linear as the voltage content of the control pulses becomes larger.

The primary object of the invention is to provide a device with which it is possible to obtain a comparatively small change of the magnetisation per control pulse while at the same time retaining a proper linear relationship between the magnetisation and the number of pulses and also retaining a comparatively large maximum control range.

According to one aspect of the invention, a pulse source supplies a series of pulses to the winding on the magnetic circuit by means of a gate circuit, and means are provided for cutting off the gate circuit under the control of a cut-off pulse, the latter being derived from a winding on the magnetic circuit or from an inductance connected in series with the pulse source when a comparatively rapid change of the magnetic flux density appears in the circuit.

In order that the invention may be readily carried into effect, some embodiments thereof will now be described in greater detail, by way of example, with reference to the accompanying drawings.

Figure 2:
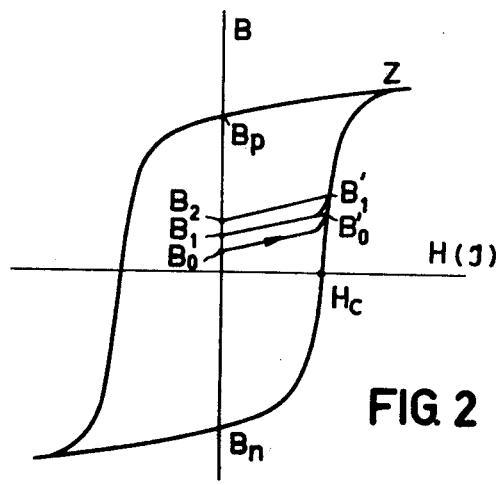

FIG. 1 shows a device for adjusting the inductance of a coil $W_1$ which is wound on a core A consisting of magnetically soft material having a comparatively high and variable permeability. The permeability and consequently also the inductance of the coil $W_1$ are dependent on the bias magnetization of the core A; this bias magnetization may be varied by varying the magnetization of the yoke D consisting of magnetic material having a substantially square or rectangular hysteresis loop. An example of such a hysteresis loop is shown in FIG. 2. The magnetic flux density B may have all possible values between the extreme values $B_n$ and $B_p$. The device shown in FIG. 1 in addition comprises a pulse source PB which may supply positive or negative pulses and which may be connected to a winding $W_2$ on the yoke D by means of a switch S.

It is assumed that at a given instant the remanence condition of the yoke D is at $B_0$, to which there corresponds a definite value of the inductance of the coil $W_1$ and that this inductance is to be decreased. By closing the switch S, positive pulses are periodically supplied to the winding $W_2$ by the pulse source PB. With the first pulse, the magnetization traverses an internal hysteresis loop $B_0-B_0'-B_1$, with the second pulse a loop $B_1-B_1'-B_2$ and so on. It is thus seen that the remanence is varied stepwise from pulse to pulse. The switch S may be opened again as soon as the desired value of inductance of the coil $W_1$ is reached. The inductance remains at this value.

Figure 3:
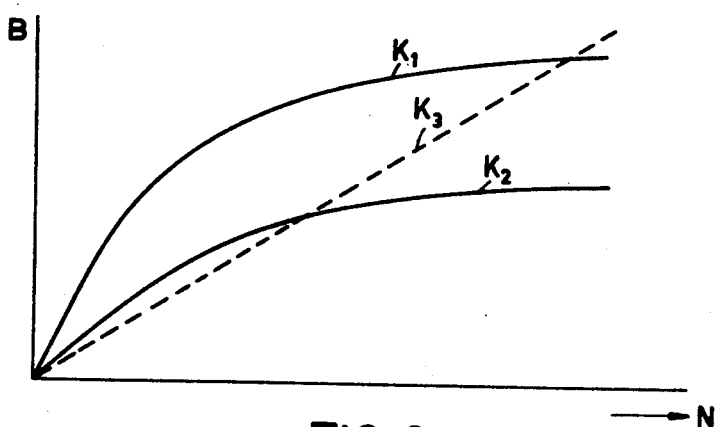

The curve $K_1$ of FIG. 3 shows how the magnetic flux density B changes as a function of the number of pulses N supplied, all of the pulses having a definite predetermined size. It can be seen from the curve $K_1$ that this relationship is non-linear and that initially a change of the remanence per pulse is much larger than after a given number of pulses have been applied, i.e. with larger magnetic flux density B. It is desired in general that the change per pulse be small so as to be able to obtain an accurate adjustment. If the strength of the pulses is decreased so as to be able to obtain a smaller change of the magnetic flux density B per pulse, the relationship between the magnetic flux density B and the number of pulses N becomes for example as shown by the curve $K_2$. While it is true, however, that the slope of this curve is somewhat less than that of the curve $K_1$, but the range across which the magnetic flux density B may be varied also is much smaller. A linear relationship such as shown by the idealized curve $K_3$ is the desideratum.

In order to be able to obtain substantially the curve $K_3$, it is apparent that the size of the pulses should be adapted to the existing remanence condition, i.e., the pulse strength should be less at low remanence values than at higher ones.

Figure 4:
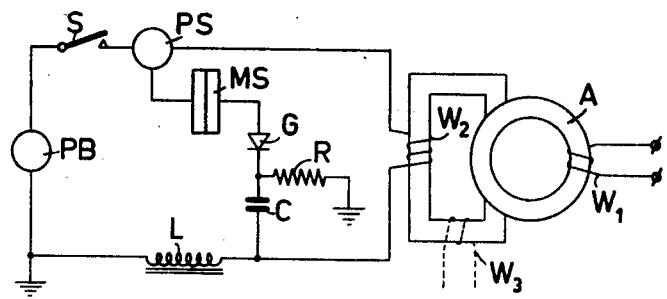

FIG. 4 shows one embodiment of a circuit arrangement by means of which the desired linear relationship may be achieved. The core A with the winding $W_1$ is again coupled to the magnetic yoke D. In this case, the gate circuit PS and the inductance L are connected in series with the winding $W_2$ on the yoke D, the pulse source PB and the switch S. The gate circuit PS is controlled by a monostable trigger circuit MS, which is normally in the rest condition, the gate PS being closed in this condition. When the switch S is closed, pulses of constant duration and amplitude are periodically supplied to the circuit by the pulse source. An example of one of these pulses is shown in FIG. 5a.

At the start of each pulse, the current through the winding $W_2$ increases comparatively rapidly, as shown in FIGURE 5b, the rate of increase being determined by the total inductance in the circuit, i.e., the inductance L and the inductance of the winding $W_2$; the magnetization traverses the branch $B_0$–$B_0'$ of the diagram shown in FIG. 2. If the values of the magnetic force of H are low (the values of the current through the winding $W_2$ being also low) the slope of these curves is comparatively small corresponding to a low value of the inductance of the winding $W_2$. During this period, substantially reversible magnetic processes occur. In this case, a comparatively low voltage is set up at the winding $W_2$, while the remainder of the pulse appears at the inductance L as shown in FIG. 5c and FIG. 5d.

As soon as the field strength H reaches a value which approximates the coercive force $H_c$, i.e., the curve $B_0$—$B_0'$ approaches the steep branch $B_n$–$H_c$–$B_0'$–Z of the larger hysteresis loop, non-reversible magnetic processes occur and the slope of the curve $B_0$—$B_0'$ suddenly increases strongly, which results in the inductance of the winding $W_2$ becoming larger. As a result of this, a larger portion of the pulse will be set up at the winding $W_2$, while the voltage at the inductance L decreases correspondingly. The voltage at the inductance L is differentiated by the differentiating network comprising the capacitor C and the resistor R, so that pulses of the shape shown in FIG. 5e are supplied to the rectifier G. The positive pulse is not passed by the rectifier G, but the next negative pulse which is set up at the inductance L is passed by the rectifier and is supplied to the monostable trigger MS which thereupon changes into the operating condition and opens the gate PS; the opening of the gate interrupts the current through the winding $W_2$ and the magnetization changes from $B_0'$ to the remanent point $B_1$. Thus, under the control of the input pulse the remanence condition has been changed from $B_0$ to $B_1$. The flyback period of the trigger arrangement is chosen so that the gate PS closes again only after the input pulse from the pulse source PB has disappeared. The pulse at the winding $W_2$ consequently is shorter than the pulses of the pulse source PB. When working with larger values of the magnetic flux density B, it will take a somewhat longer time before the current through the winding $W_2$ has reached a value such that non-reversible processes occur and the inductance of the winding $W_2$ increases. The pulses through the winding $W_2$ will consequently be somewhat longer also; in other words, the size of the pulses is adapted to the instantaneous value of the magnetic flux density B which, as was explained above, is necessary to create a linear relationship between the magnetic flux density B and the number of pulses as is shown by the curve $K_3$ in FIG. 3.

Instead of deriving the control voltage of the monostable trigger arrangement MS from the voltage across the inductance L, it may be derived from the voltage across the winding $W_2$; this voltage increases abruptly when the inductance of the winding $W_2$ increases. The control voltage may also be derived from an auxiliary winding $W_3$ on the yoke D, since the mutual inductance between the windings $W_2$ and $W_3$ will suddenly increase when the permeability in the yoke D increases.

Figure 6:
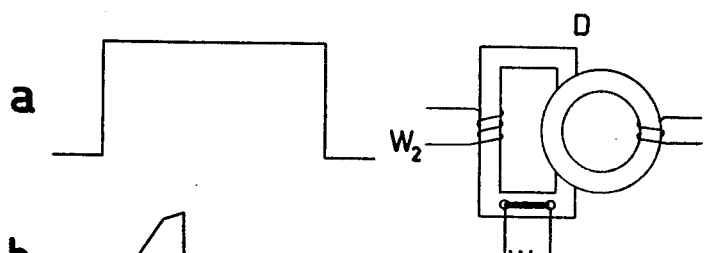

The instant at which non-reversible magnetic changes start occurring may be determined quite accurately by deriving the control voltage for the monostable trigger arrangement MS from an auxiliary winding which is threaded through a lateral aperture in the magnetic yoke D in a manner such that this winding is magnetically coupled to transverse components of the magnetic field in the yoke D; an example of this is shown in FIG. 6, in which the winding $W_4$ is threaded through two apertures in the yoke D. By supplying a strong pulse to the winding $W_4$ before closing switch S, the magnetic field in the proximity of the winding $W_4$ is partially oriented at right angles to the longitudinal direction of the magnetic circuit. The control pulses are again supplied to the winding $W_2$ through gate PS. As soon as the current through the winding $W_2$ reaches a value at which non-reversible processes occur, there will be a tendency of the transverse magnetization to change over into longitudinal magnetization; when this occurs, a pulse is produced in the winding $W_4$. As soon as this occurs, however, the control pulse is discontinued as described by means of the gate circuit PS.

Figures 5, 7:
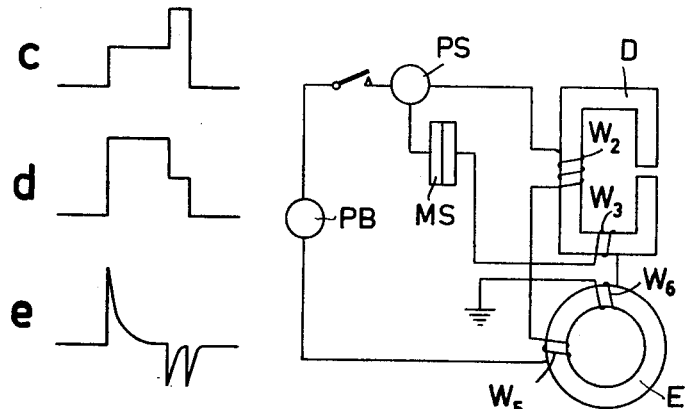

In the devices described, the control pulses are cut off at the instant at which a remanent change of the magnetization occurs; this is done under the control of a pulse which occurs as soon as a comparatively steep part of an internal loop is reached. If the pulse for cutting off the gate circuit PS is derived from an auxiliary winding on the yoke D, for example $W_3$ of FIG. 4 or $W_4$ of FIG. 6, it is posisble that an output pulse may appear when the magnetization is still in the reversible part of the curve $B_0$—$B_0'$; this may occur because, although this part is comparatively flat, it is still accompanied by a certain change of the magnetic flux density B. To prevent this, a compensation circuit arrangement may be used, for example as shown in FIG. 7. In this case, the winding $W_5$ on the auxiliary core E consisting of magnetically soft material is connected in series with the winding $W_2$ on the yoke D. The cut off pulse for the monostable trigger arrangement MS is derived from the windings $W_3$ and $W_6$ connected in series opposition. The ratio of the number of turns is chosen so that as long as the magnetization passes along the flat reversible part of the curve $B_0$—$B_0'$ no output pulse is produced, but the bridge balance is interrupted as soon as the steeper part of the curve is reached; when this occurs, an output pulse appears which brings the trigger arrangement MS in the operating condition and opens the gate circuit PS.

Various embodiments of the invention have been shown and described. It is to be understood that many modifications in the form and detail thereof will be readily apparent to those skilled in the art without departing from the inventive concept, the scope of which is set forth in the appended claims.

What is claimed is:

1. A circuit arrangement for linearly changing the remanence condition of a magnetic circuit, comprising: a magnetic circuit including a magnetic element having magnetic remanence properties, a winding inductively coupled to said magnetic circuit, supply means for supplying a controllable number of pulses to said winding through a normally closed gate circuit, each of said pulses causing a slow and a rapid change in the magnetic flux density of said magnetic circuit, a trigger circuit for controlling said gate circuit, said trigger circuit being coupled to said winding, said trigger circuit operating after the start of each pulse in response to a rapid change in magnetic flux density of said magnetic circuit to open said gate circuit, whereby the size of each pulse applied to said winding varies according to the rapid change in magnetic flux density produced by said pulse.

2. A circuit arrangement for linearly changing the remanence condition of a magnetic circuit, comprising: a magnetic circuit including a magnetic element having magnetic remanence properties, a winding inductively coupled to said magnetic circuit, supply means for supplying a controllable number of pulses to said winding through a normaly closed gate circuit and a series connected auxiliary inductance, each of said pulses causing a slow and a rapid change in the magnetic flux density of said mgnetic circuit, a trigger circuit for controlling said gate circuit, said trigger circuit being coupled to said auxiliary inductance, said trigger circuit operating after the start of each pulse in response to a pulse produced by said auxiliary inductance by a rapid change in magnetic flux density of said magnetic circuit to open said gate circuit, whereby the size of each pulse applied to said winding varies according to the rapid change in magnetic flux density produced by said pulse.

3. A circuit arrangement according to claim 2, wherein said trigger circuit is a monostable trigger having a flyback period longer than the duration of the supplied pulses.

4. A circuit arrangement for linearly changing the remanence condition of a magnetic circuit, comprising: a magnetic circuit including a magnetic element consisting of lateral and longitudinal portions and having magnetic remanence properties, a first winding inductively coupled to said magnetic circuit, supply means for supply a controllable number of pulses to said first winding through a normally closed gate circuit, each of said pulses causing a slow and a rapid change in the magnetic flux density of said magnetic circuit, a monostable trigger circuit for controlling said gate circuit, an auxiliary winding wound in lateral apertures in said element and inductively coupled to the transverse components of the magnetic field in said element, means for supplying an orienting pulse to said auxiliary winding, said trigger circuit being coupled to said auxiliary winding, said trigger circuit operating after the start of each pulse in response to a rapid change in magnetic flux density of said magnetic circuit to open said gate circuit, whereby the size of each pulse applied to said winding varies according to the rapid change in magnetic flux density produced by said pulse.

5. A circuit arrangement for linearly changing the remanence condition of a magnetic circuit, comprising: a magnetic circuit including a magnetic element having magnetic remanence properties, an input winding inductively coupled to said magnetic circuit, supply means for supplying a controllable number of pulses to said winding through a normally closed gate circuit, each of said pulses causing a slow and a rapid change in the magnetic flux density of said magnetic circuit, an auxiliary winding inductively coupled to said magnetic circuit, a trigger circuit for controlling said gate circuit, said trigger circuit being coupled to said auxiliary winding, said trigger circuit operating after the start of each pulse in response to a rapid change in magnetic flux density of said magnetic circuit to open said gate circuit, and a compensating circuit for preventing operation of said trigger in response to a slow change in magnetic flux density, said compensating circuit comprising a magnetic core having substantially no magnetic remanence, first and second windings inductively coupled to said core, said first winding being connected in series with said input winding and said supply means, said second winding being connected in series opposition to said auxiliary winding, whereby the size of each pulse applied to said input winding varies according to the rapid change in magnetic flux density produced by said pulse.

References Cited by the Examiner

UNITED STATES PATENTS

| 2,925,958 | 2/60 | Polzin et al. | 340—174 |
| 2,958,787 | 11/60 | Hardenbergh | 340—174 |
| 2,990,540 | 6/61 | Sublette et al. | 340—174 X |
| 3,015,732 | 1/62 | Kuntzleman et al. | 340—174 |

IRVING L. SRAGOW, *Primary Examiner.*